(12) United States Patent
Hasuo

(10) Patent No.: US 12,476,523 B2
(45) Date of Patent: Nov. 18, 2025

(54) LAMINATED IRON CORE PRODUCTION DEVICE, LAMINATED IRON CORE, AND LAMINATED IRON CORE PRODUCTION METHOD

(71) Applicant: MITSUI HIGH-TEC, INC., Fukuoka (JP)

(72) Inventor: Yusuke Hasuo, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 199 days.

(21) Appl. No.: 18/274,873

(22) PCT Filed: Feb. 15, 2021

(86) PCT No.: PCT/JP2021/005534
§ 371 (c)(1),
(2) Date: Jul. 28, 2023

(87) PCT Pub. No.: WO2022/172451
PCT Pub. Date: Aug. 18, 2022

(65) Prior Publication Data
US 2024/0113603 A1    Apr. 4, 2024

(51) Int. Cl.
*H02K 15/021*    (2025.01)
*H02K 1/16*    (2006.01)

(52) U.S. Cl.
CPC .......... *H02K 15/021* (2025.01); *H02K 1/16* (2013.01)

(58) Field of Classification Search
CPC ................. H02K 15/021; H02K 1/16
(Continued)

(56) References Cited

U.S. PATENT DOCUMENTS

2016/0336840 A1  11/2016 Hasuo et al.
2018/0056629 A1  3/2018 Hamamura
(Continued)

FOREIGN PATENT DOCUMENTS

JP  60-121429  8/1985
JP  2001-25218  1/2001
(Continued)

OTHER PUBLICATIONS

International Search Report issued in International Patent Application No. PCT/JP2021/005534, dated Apr. 20, 2021. along with an English translation thereof.
(Continued)

*Primary Examiner* — Jose A Gonzalez Quinones
(74) *Attorney, Agent, or Firm* — STERNE, KESSLER, GOLDSTEIN & FOX P.L.L.C.

(57) ABSTRACT

A laminated iron core manufacturing apparatus for laminating a plurality of punched members obtained by punching a plate-shaped member, including: a convey unit conveys the plate-shaped member; a lifter supports the plate-shaped member; a liquid material supply unit adheres a liquid material to regions to be the punched members of one main surface of the plate-shaped member; and a punching unit to punches the plate-shaped member after the liquid material is applied to form the punched members. The liquid material supply unit adheres the liquid material to the plate-shaped member while avoiding, in the regions to be the punched members in the plate-shaped member, a contact region where the lifter on a downstream side of an adhesion location of the liquid material in the liquid material supply unit and on an upstream side of the punching unit comes into contact with the plate-shaped member.

9 Claims, 9 Drawing Sheets

(58) Field of Classification Search
USPC .................................................. 310/216.065
See application file for complete search history.

(56) References Cited

U.S. PATENT DOCUMENTS

| | | |
|---|---|---|
| 2019/0028006 A1 | 1/2019 | Hamamura et al. |
| 2019/0259531 A1 | 8/2019 | Okudaria et al. |
| 2021/0057969 A1 | 2/2021 | Okudaira et al. |
| 2022/0165492 A1 | 5/2022 | Okudaira et al. |
| 2022/0393558 A1 | 12/2022 | Kurosaki |

FOREIGN PATENT DOCUMENTS

| | | | |
|---|---|---|---|
| JP | 2003-200296 | | 7/2003 |
| JP | 2009-72794 | | 4/2009 |
| JP | 5160862 | | 3/2013 |
| JP | 2016-214000 | | 12/2016 |
| JP | 2017-93191 | | 5/2017 |
| JP | 2018-38119 | | 3/2018 |
| JP | 2018-129981 | | 8/2018 |
| JP | 2018129981 A | * | 8/2018 |
| JP | 2019-22341 | | 2/2019 |
| WO | 2018/127983 | | 7/2018 |
| WO | 2019/180856 | | 9/2019 |

OTHER PUBLICATIONS

Written Opinion issued in International Patent Application No. PCT/JP2021/005534, dated Apr. 20, 2021.

* cited by examiner

LAMINATED IRON CORE PRODUCTION DEVICE, LAMINATED IRON CORE, AND LAMINATED IRON CORE PRODUCTION METHOD

TECHNICAL FIELD

The present disclosure relates to a laminated iron core manufacturing apparatus, a laminated iron core, and a laminated iron core manufacturing method.

BACKGROUND ART

Patent Literature 1 discloses a laminated iron core manufacturing apparatus that laminates and adheres core thin plates punched from a belt-shaped steel plate into a predetermined shape using a die. In such a manufacturing apparatus, it is known that the core thin plate is punched out after an adhesive is applied to a predetermined position of the steel plate.

CITATION LIST

Patent Literature

Patent Literature 1: JP5160862B

SUMMARY OF INVENTION

Technical Problem

By the way, a plate-shaped member used for a laminated iron core is becoming thinner in response to a need for higher efficiency of a motor. As a result, part of the plate-shaped member that is being punched hangs down during conveying and interferes with a die. Therefore, in order to prevent the interference, a lifter is used to lift the plate-shaped member from the die and convey the plate-shaped member.

However, when the lifter is provided in a manufacturing apparatus that applies an adhesive before punching out a core thin plate, there is a possibility that the adhesive applied to a core steel plate will adhere to the lifter.

An object of the present disclosure is to provide a laminated iron core, a laminated iron core manufacturing method, and a laminated iron core manufacturing apparatus in which a liquid material applied to a plate-shaped member is prevented from adhering to a lifter.

Solution to Problem

In order to achieve the above object, a laminated iron core manufacturing apparatus according to an aspect of the present disclosure is a laminated iron core manufacturing apparatus for laminating a plurality of punched members obtained by punching a plate-shaped member, including: a convey unit configured to convey the plate-shaped member; a lifter configured to support the plate-shaped member conveyed by the convey unit; a liquid material supply unit configured to adhere a liquid material to regions to be the punched members of one main surface of the plate-shaped member conveyed by the convey unit; and a punching unit configured to punch the plate-shaped member after the liquid material is applied to form the punched members, in which the liquid material supply unit adheres the liquid material to the plate-shaped member while avoiding, in the regions to be the punched members, a contact region where the lifter on a downstream side of an adhesion location of the liquid material in the liquid material supply unit and on an upstream side of the punching unit comes into contact with the plate-shaped member.

A laminated iron core according to an aspect of the present disclosure is a laminated iron core in which three or more punched members obtained by punching a plate-shaped member are laminated and adhered with an adhesive, in which each of adhesive-unapplied regions is provided between the adjacent punched members, and the adhesive-unapplied region provided between the adjacent punched members includes a non-overlapped region in a plan view.

A laminated iron core manufacturing method according to an aspect of the present disclosure is a laminated iron core manufacturing method for laminating a plurality of punched members obtained by punching a plate-shaped member, including: adhering a liquid material to regions to be the punched members of one main surface of the plate-shaped member; supporting the conveyed plate-shaped member by a lifter; and punching the plate-shaped member after adhering the liquid material to form the punched members, in which adhering the liquid material includes adhering the liquid material to the plate-shaped member while avoiding, in the regions to be the punched members, a contact region where the lifter on a downstream side of an adhesion location of the liquid material and on an upstream side of a forming location of the punched members comes into contact with the plate-shaped member.

Advantageous Effects of Invention

According to the present disclosure, a laminated iron core, a laminated iron core manufacturing method, and a laminated iron core manufacturing apparatus in which a liquid material applied to a plate-shaped member is prevented from adhering to a lifter are provided.

DESCRIPTION OF EMBODIMENTS

Figure 1:
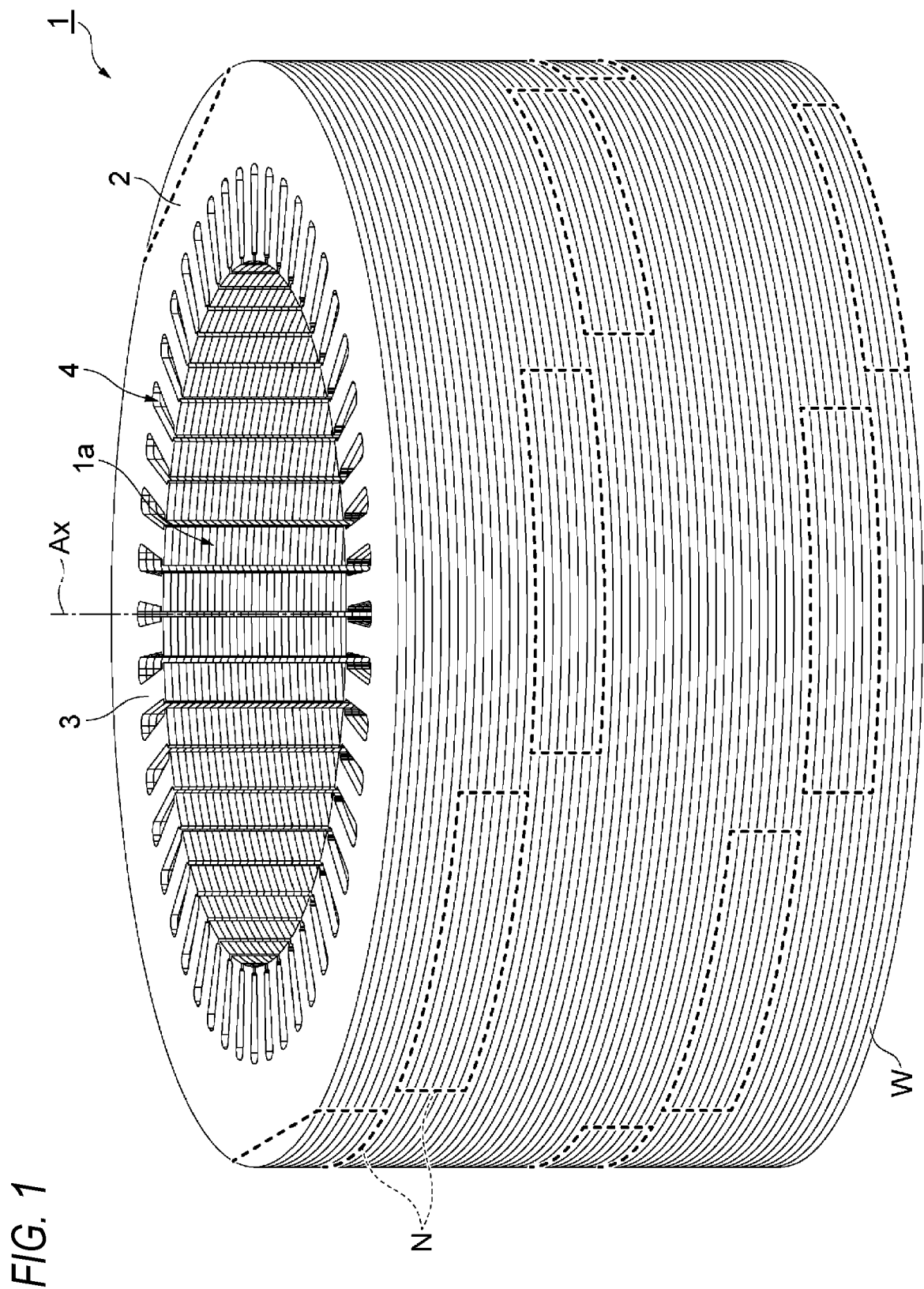
FIG. 1 is a perspective view showing an example of a stator laminated iron core.

Hereinafter, aspects for implementing the present disclosure are described in detail with reference to the accompanying drawings. In illustrations of the drawings, the same elements are denoted by the same reference numerals, and duplicate descriptions are omitted.

Configuration of Stator Laminated Iron Core

First, a configuration of a stator laminated iron core 1 will be described with reference to FIG. 1. The stator laminated iron core 1 is a part of a stator. The stator is obtained by attaching windings to the stator laminated iron core 1. The stator is combined with a rotor to form an electric motor (motor).

The stator laminated iron core 1 is constructed by laminating a plurality of punched members W (core members). The stator laminated iron core 1 has a cylindrical shape. That is, a through hole 1a extending along a central axis Ax is provided in a central portion of the stator laminated iron core 1. The rotor may be disposed in the through hole 1a.

The stator laminated iron core 1 includes a yoke portion 2 and a plurality of tooth portions 3. The yoke portion 2 has an annular shape and extends in a manner of surrounding the central axis Ax. A width, an inner diameter, an outer diameter, and a thickness of the yoke portion 2 in a radial direction (hereinafter, simply referred to as "radial direction") can be set to any magnitude according to applications and performance of the motor.

A plurality of lug portions (not shown) protruding radially outward may be integrally provided on an outer peripheral surface of the yoke portion 2. The lug portion may be provided with a through hole penetrating the lug portion in a lamination direction of the stator laminated iron core 1. The through hole functions, for example, as an insertion hole for a bolt for fixing the stator laminated iron core 1 to a housing (not shown) of the electric motor. The number of lug portions (the number of through holes) may be appropriately set according to the type of stator laminated iron core 1 and the like.

The tooth portions 3 extend along the radial direction of yoke portion 2 from an inner edge of yoke portion 2 toward a central axis Ax side. That is, each tooth portion 3 protrudes toward the central axis Ax side from the inner edge of the yoke portion 2. In the stator laminated iron core 1, 48 tooth portions 3 are formed integrally with the yoke portion 2. The tooth portions 3 are arranged at substantially equal intervals in a circumferential direction. A slot 4, which is a space for arranging a winding (not shown), is provided between the adjacent tooth portions 3.

Figure 5:
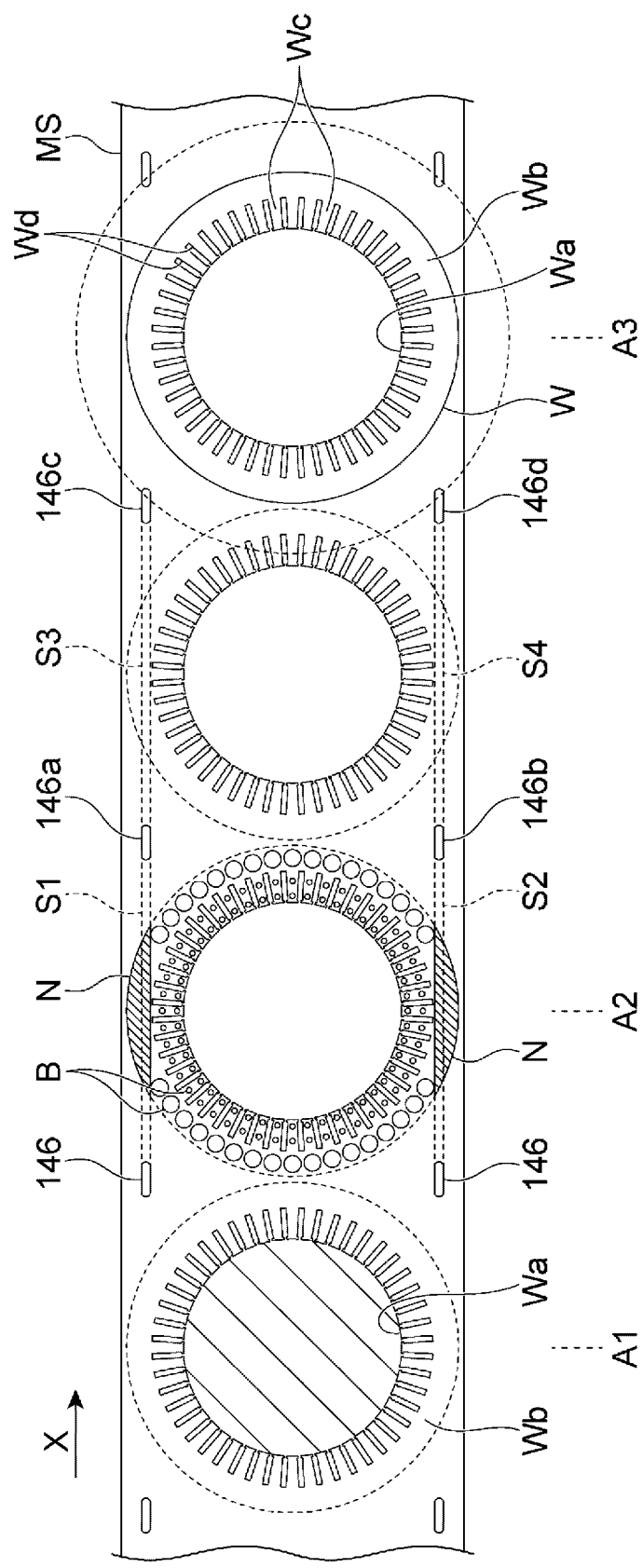
FIG. 5 is a diagram showing an example of a processing layout of the stator laminated iron core.

The stator laminated iron core 1 is constructed by laminating the plurality of punched members W (core members). The punched member W is a plate-shaped body obtained by punching a magnetic steel plate MS (plate-shaped member) into a predetermined shape, and has a shape corresponding to the stator laminated iron core 1. Therefore, as shown in FIG. 5, a through hole Wa corresponding to the through hole 1a of the stator laminated iron core 1 is formed in each of the punched members W. Further, the punched member W is provided with an annular portion Wb corresponding to the yoke portion 2, tooth pieces Wc corresponding to the tooth portions 3, and concave portions Wd corresponding to the slots 4. In the following embodiments, a case of manufacturing the laminated iron core by punching the magnetic steel plate MS will be described, but the plate-shaped member used for the laminated iron core is not limited to the magnetic steel plate. As the plate-shaped member, in addition to the magnetic steel plate, a member made of a general core material such as an amorphous metal plate and an alloy plate can be used. A thickness of the plate-shaped member can be, for example, about 0.1 mm to 0.5 mm, but is not limited to this range.

The plurality of punched members W are fixed to each other with an adhesive. In a laminated iron core manufacturing apparatus described later, the punched member W is formed by punching the magnetic steel plate MS after the adhesive is applied to one surface of the magnetic steel plate MS. The stator laminated iron core 1 is manufactured by laminating the plurality of punched members W formed in this way, each of which has one surface applied with the adhesive. Although the details will be described later, in the laminated iron core manufacturing apparatus, a part of the adhesive-applied surface of the punched member W is formed with a region where the adhesive is not applied.

The stator laminated iron core 1 may be implemented by so-called rotating lamination. The term "rotating lamination" refers to laminating the plurality of punched members W while shifting an angle between the punched members W relatively. The rotating lamination is performed mainly for a purpose of canceling a plate thickness deviation of the punched members W and increasing flatness, parallelism, and perpendicularity of the stator laminated iron core 1. An angle of the rotating lamination may be set to any magnitude.

In the stator laminated iron core 1, a process of laminating several punched members W in the same direction and then changing the angle between the punched members W by the rotating lamination is repeated. Accordingly, a location where the adhesive is not applied (unapplied region N) is prevented from biasing toward a specific direction of the stator laminated iron core 1. This point will be described later.

Configuration of Laminated Iron Core Manufacturing Apparatus

Figure 2:
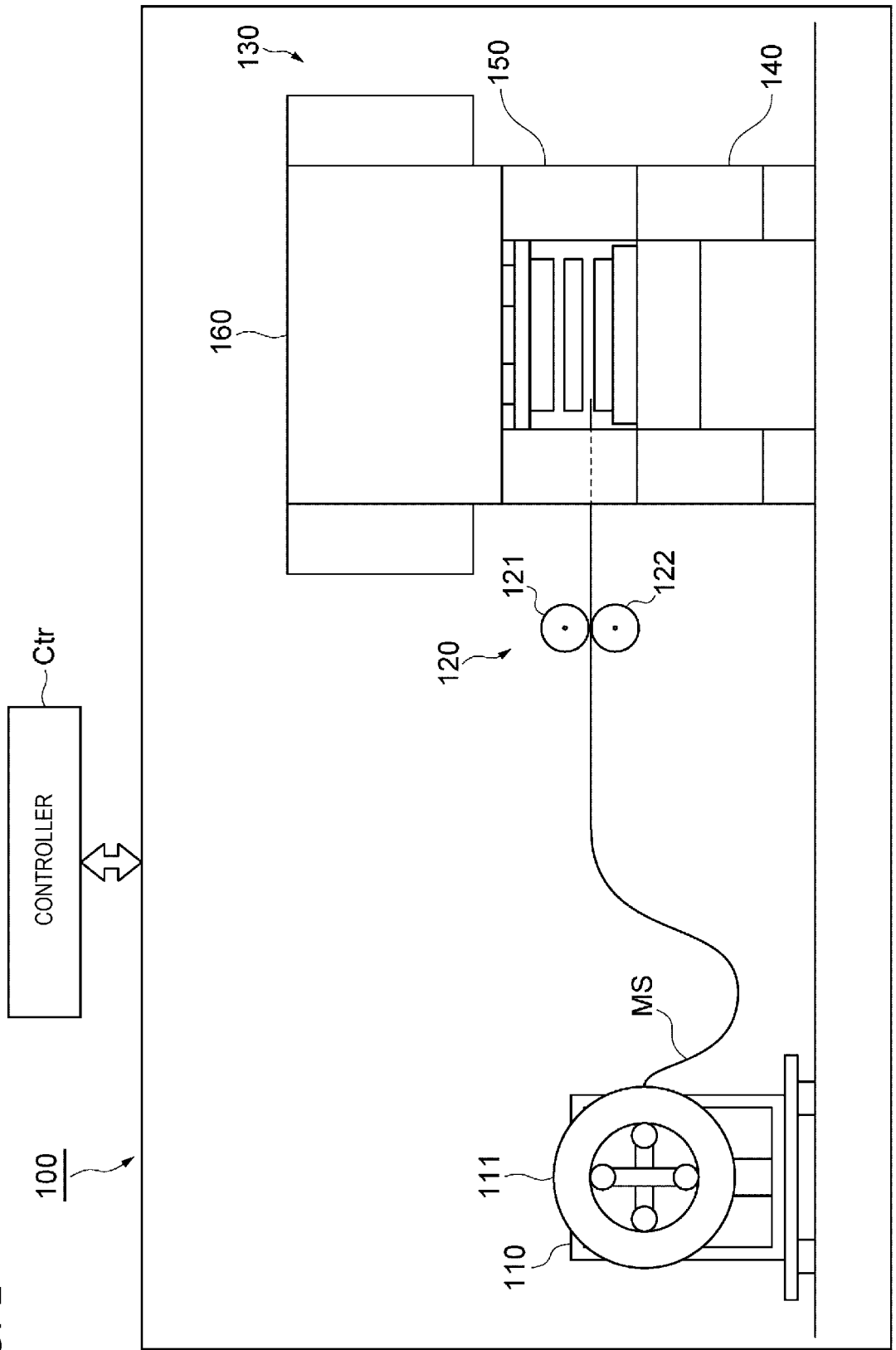
FIG. 2 is a schematic diagram showing an example of a laminated iron core manufacturing apparatus.

Next, a laminated iron core manufacturing apparatus 100 will be described with reference to FIG. 2. The manufacturing apparatus 100 is configured to manufacture a laminated body 10 from the belt-shaped magnetic steel plate MS. As shown in FIG. 2, the manufacturing apparatus 100 includes an uncoiler 110, a feed device 120, a pressing device 130, and a controller Ctr (control unit).

The uncoiler 110 is configured to rotatably hold a coil material 111. The coil material 111 is obtained by winding the magnetic steel plate MS in a coil shape (spiral shape). The feed device 120 includes a pair of rollers 121 and 122 that sandwich the magnetic steel plate MS from above and below. The pair of rollers 121 and 122 are configured to rotate and stop based on an instruction signal from the controller Ctr, and progressively feed out the magnetic steel plates MS intermittently toward the pressing device 130. That is, the pair of rollers 121 and 122 has a function as a convey unit for conveying the magnetic steel plate MS.

The pressing device 130 is configured to operate based on the instruction signal from the controller Ctr. The pressing device 130 may be configured, for example, to form the plurality of punched members W by sequentially punching the magnetic steel plate MS fed by the feed device 120 with a plurality of punches. The pressing device 130 may be configured to sequentially laminate the plurality of punched members W obtained by punching to form the laminated body 10. The configuration of the pressing device 130 will be described later.

The controller Ctr is configured to generate an instruction signal for causing the feed device 120 and the pressing device 130 to operate based on, for example, a program recorded in a recording medium (not shown) or an operation input from an operator. The controller Ctr is configured to transmit the instruction signal to the feed device 120 and the pressing device 130.

Details of Pressing Device

Figure 3:
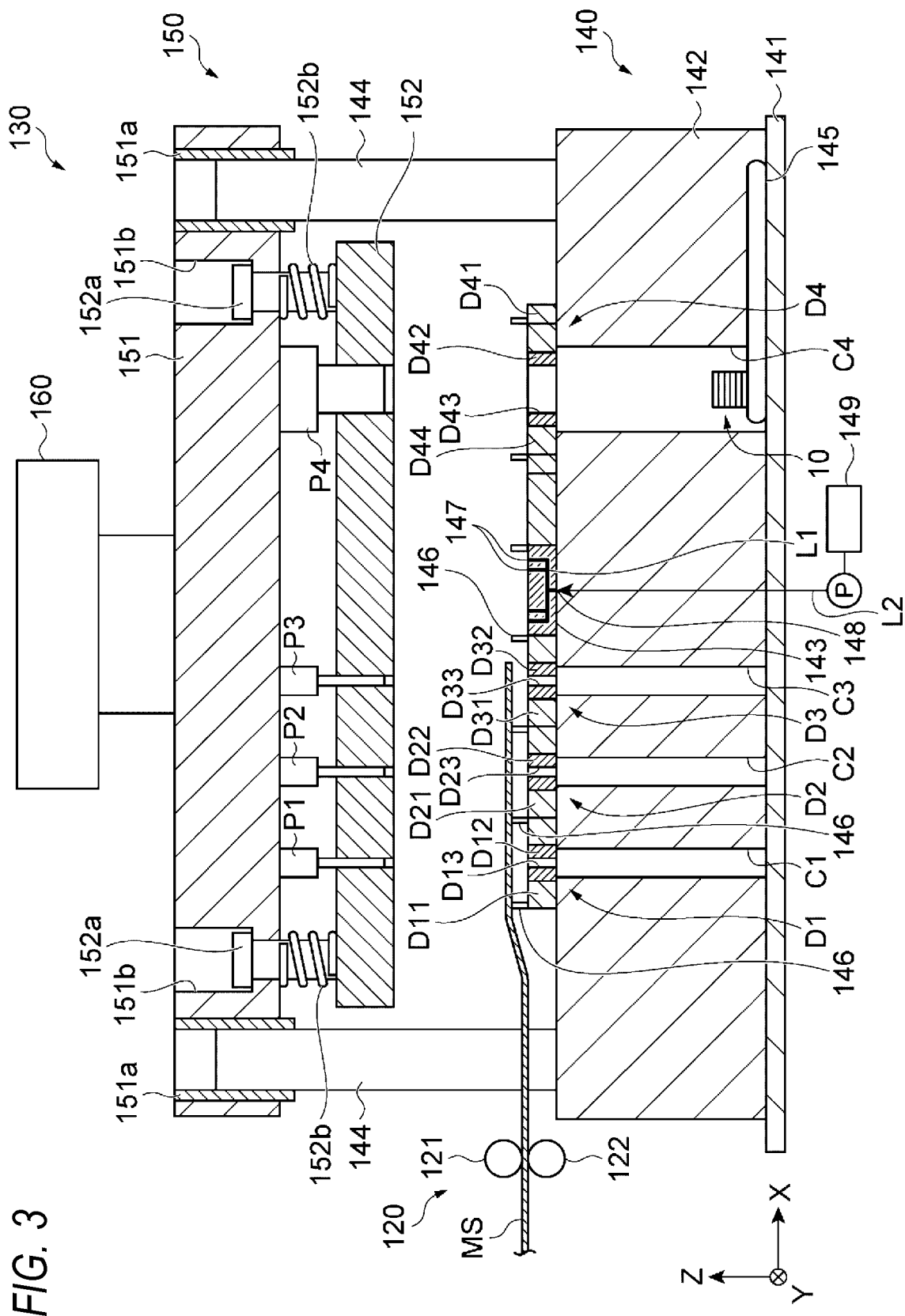
FIG. 3 is a schematic cross-sectional view showing an example of a pressing device.

Next, details of the pressing device 130 according to the embodiment will be described with reference to FIGS. 3 and 4. As shown in FIG. 3, the pressing device 130 includes a lower die 140, an upper die 150, and a press machine 160. The lower die 140 includes a base 141, a die holder 142, die members D1 to D4, an adhesive supply unit 143 (liquid material supply unit), a plurality of guide posts 144, and a convey mechanism 145.

The base 141 is fixed, for example, on a floor surface and functions as a foundation for the entire pressing device 130. The die holder 142 is supported on the base 141. A plurality of discharge holes C1 to C4 are formed in the die holder 142. The die holder 142 may be made of, for example, a steel material (raw material) that is not subjected to a heat treatment such as quenching.

The plurality of discharge holes C1 to C4 may be inside the die holder 142 and extend in an up-down direction (see an arrow Z in FIG. 3). Materials punched out from the magnetic steel plate MS (for example, the punched members W and waste materials) are discharged from the plurality of discharge holes C1 to C4.

The die members D1 to D4 are attached to an upper portion of the die holder 142 in a manner of being adjacent to each other in a conveying direction X of the magnetic steel plate MS. The plurality of die members D1 to D4 are arranged in an order from an upstream side to a downstream side in the conveying direction X of the magnetic steel plate MS. The adhesive supply unit 143 is provided between the die member D3 and the die member D4.

The die members D1 to D3 basically have a common configuration.

The die member D1 includes a die plate D11 and a die D12. The die plate D11 is configured to hold the die D12 in a through hole formed in a center portion. The die plate D11 may be made of, for example, a steel material that is subjected to the heat treatment such as quenching. The die D12 may be made of cemented carbide containing tungsten carbide, for example. A die hole D13 penetrating in the up-down direction is formed in the die D12. The die hole D13 and a punch P1 are configured as a unit for punching the magnetic steel plate MS. The die hole D13 communicates with the discharge hole C1. By inserting and removing the punch P1 into and from the die hole D13, the magnetic steel plate MS is punched into a shape along a contour of the die hole D13. A metal piece punched out from the magnetic steel plate MS is discharged to the outside of the pressing device 130 through the discharge hole C1.

The die member D2 includes a die plate D21 and a die D22. The die plate D21 is configured to hold the die D22 in a through hole formed in a center portion. Materials of the die plate D21 and the die D22 may be the same as those of the die plate D11 and the die D12, respectively. A die hole D23 penetrating in the up-down direction is formed in the die D22. The die hole D23 and a punch P2 are configured as a unit for punching the magnetic steel plate MS. The die hole D23 communicates with the discharge hole C2. By inserting and removing the punch P2 into and from the die hole D23, the magnetic steel plate MS is punched into a shape along a contour of the die hole D23. The metal piece punched out from the magnetic steel plate MS is discharged to the outside of the pressing device 130 through the discharge hole C2.

The die member D3 includes a die plate D31 and a die D32. The die plate D31 is configured to hold the die D32 in a through hole formed in a center portion. Materials of the die plate D31 and the die D32 may be the same as those of the die plate D11 and the die D12, respectively. A die hole D33 penetrating in the up-down direction is formed in the die D32. The die hole D33 and a punch P3 described later are configured as a unit for punching the magnetic steel plate MS. The die hole D33 communicates with the discharge hole C3. By inserting and removing the punch P3 into and from the die hole D33, the magnetic steel plate MS is punched into a shape along a contour of the die hole D33. The metal piece punched out from the magnetic steel plate MS is discharged to the outside of the pressing device 130 through the discharge hole C3.

Figure 4:
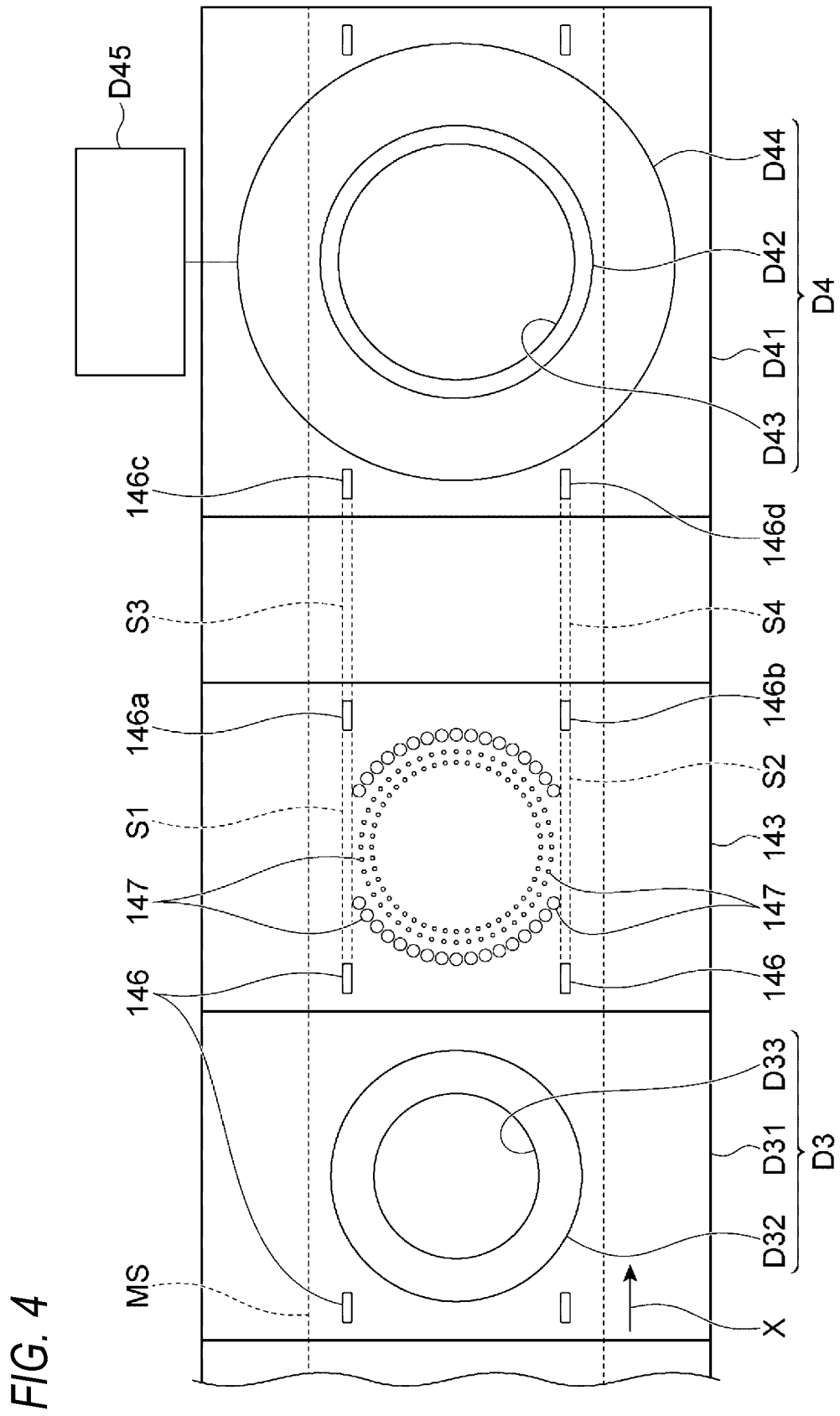
FIG. 4 is a top view schematically showing an example of a part of a die member and an adhesive supply unit included in the pressing device.

In the present embodiment, as shown in FIG. 4, the through hole Wa of the punched member W corresponding to the through hole 1a is formed in the magnetic steel plate MS by punching with the die member D3. The concave portions Wd of punched member W corresponding to the slots 4 of the stator laminated iron core 1 may be formed in the magnetic steel plate MS by punching with the die member D1 or the die member D2.

The adhesive supply unit 143 has a function of supplying the adhesive to the magnetic steel plate MS. As shown in FIG. 4, the adhesive supply unit 143 is a rectangular plate-shaped body and can be disposed on the die holder 142 in the same manner as the die members D1 to D4. A plurality of ejection ports 147 for ejecting the adhesive are provided on a surface of the adhesive supply unit 143. Inside the adhesive supply unit 143, a supply path L1 connected to the ejection ports 147 and supplying the adhesive to the ejection ports 147 is provided.

The ejection ports 147 are disposed in a substantially annular shape as shown in FIG. 4. The ejection ports 147 are disposed such that the adhesive is applied to the annular portion Wb of the punched member W and lower surfaces of the tooth pieces Wc. However, the disposing of the ejection ports 147 is set such that a region where the adhesive is not applied is formed in a part of the annular portion Wb.

Specifically, when the magnetic steel plate MS moves along the conveying direction X, the ejection port 147 is not provided in a region on a lower surface of the magnetic steel plate MS that is expected to come into contact with lifters 146. As shown in FIG. 4, when the lifters 146 are arranged along the conveying direction X, the lifters 146 on a downstream side of the ejection port 147 in the adhesive supply unit 143 support the magnetic steel plate MS after the adhesive is applied. Specifically, among the plurality of lifters 146, the magnetic steel plate MS after being applied with the adhesive is supported by lifters 146a, 146b, 146c, and 146d on the downstream side of the ejection ports 147 of the adhesive supply unit 143 and an upstream side of the die hole D43 along the conveying direction X. The lifter 146a and the lifter 146c, and the lifter 146b and the lifter 146d are arranged in a row along the conveying direction X, respectively. Under such conditions, the lifters 146a and 146c can come into contact with a contact region S1 indicated by dashed lines on the lower surface of the magnetic steel plate MS. The lifter 146c can come into contact with a contact region S3 indicated by the dashed lines on the lower surface of the magnetic steel plate MS. Similarly, the lifter 146b and the lifter 146d can come into contact with a contact region S2 indicated by dashed lines on the lower surface of the magnetic steel plate MS. The lifter 146d can come into contact with a contact region S4 indicated by the dashed lines on the lower surface of the magnetic steel plate MS. Therefore, the ejection ports 147 are arranged such that the adhesive does not adhere to the contact regions S1 to S4. In the example shown in FIG. 4, the ejection ports 147 are arranged closer to the center of the magnetic steel plate MS than the contact regions S1 to S4. The center of the magnetic steel plate MS corresponds to the center of the punched member W after being punched out.

The supply path L1 is formed such that a predetermined amount of the adhesive can be ejected from the ejection ports 147 onto the surface of the adhesive supply unit 143. An end portion 148 of the supply path L1 on a side opposite to an ejection port 147 side is connected to a liquid tank 149 provided outside via a pipe L2. A liquid feed pump P is provided in the pipe L2 between the liquid tank 149 and the end portion 148. The liquid feed pump P supplies the adhesive from the liquid tank 149 to the adhesive supply unit 143 by being driven, for example, based on the instruction from the controller Ctr. The supplied adhesive is supplied to the surface of the adhesive supply unit 143 from the plurality of ejection ports 147 through the supply path L1.

The die member D4 includes a die plate D41, a die D42, a rotation member D44, and a drive mechanism D45. The die plate D41 of the die member D4 is configured to hold the die D42 supported by the rotation member D44 within a through hole provided in a center portion. The rotation member D44 is provided between the die plate D41 and the die D42. The rotation member D44 may be held with respect to the die plate D41 to be rotatable about a central axis extending along a vertical direction. The die D42 is supported by the rotation member D44. As a result, the die D42 is rotatable about the central axis extending in the vertical direction with respect to the die plate D41 while being supported by the rotation member D44. A material of the die plate D41 may be the same as that of the die plate D11 or the die D12. A material of the die D42 may be the same as that of the die plate D11 or the die D12. A material of the rotation member D44 may be the same as that of the die plate D11 or the die D12.

A die hole D43 penetrating in the up-down direction is formed in the die D42. The die hole D43 and a punch P4 are configured as a unit for punching the magnetic steel plate MS. The punched member W may be formed from the magnetic steel plate MS by punching the magnetic steel plate MS by the unit. That is, the die D42 and the punch P4 have a function as a punching unit for punching the magnetic steel plate MS to form the punched member W. The die hole D43 may, for example, have a circular shape as a whole.

The die hole D43 communicates with the discharge hole C4. By inserting and removing the punch P4 into and from the die hole D43, the magnetic steel plate MS is punched into a shape along a contour of the die hole D43. The punched member W punched out from the magnetic steel plate MS is laminated in the die hole D43 and on the previously obtained punched member W. In this case, the punched member W punched out from the magnetic steel plate MS is adhered to the previously obtained punched member W by the adhesive applied to the lower surface of the punched member W. After a predetermined number of punched members W are laminated in the die hole D43, the obtained laminated body 10 is placed on the convey mechanism 145 through the discharge hole C4.

The drive mechanism D45 is connected to the rotation member D44. The drive mechanism D45 causes the rotation member D44 to rotate about central axes of the rotation member D44 and the die D42 based on the instruction signal from the controller Ctr. Therefore, after the punched member W punched out from the magnetic steel plate MS is laminated on the previously obtained punched member W, the subsequent punched member W is rotated and laminated onto the previously obtained punched member W by rotating the die D42 by a predetermined angle. The drive mechanism D45 may be configured by, for example, a combination of a rotary motor, a gear, and a timing belt. In this way, the rotation member D44 and the drive mechanism D45 function as a rotating lamination unit for rotating and laminating the punched members W.

As shown in FIG. 3, the plurality of guide posts 144 linearly extend upward from the die holder 142. The plurality of guide posts 144 are configured to guide the upper die 150, together with guide bushes 151a (described later), in the up-down direction. The plurality of guide posts 144 may be attached to the upper die 150 so as to extend downward from the upper die 150.

The convey mechanism 145 is configured to operate based on the instruction from the controller Ctr, and to feed the laminated body 10 dropped from the die D42 to a subsequent device (for example, a magnet attaching device, a resin injection device, a welding device, and a shaft attaching device). One end of the convey mechanism 145 is located inside the discharge hole C4, and the other end of the convey mechanism 145 is located outside the pressing device 130. The convey mechanism 145 may be, for example, a belt conveyor.

As shown in FIG. 3, surfaces of the die plates D11, D21, D31, and D41, and the adhesive supply unit 143 are flat. The die plates D11, D21, D31, and D41, and the adhesive supply unit 143 are provided with the lifters 146 protruding upward from the surfaces thereof.

The lifters 146 are provided such that the magnetic steel plate MS conveyed over the die plates D11, D21, D31, and D41, and the adhesive supply unit 143 is supported in a state of being separated from the surfaces of the die plates D11, D21, D31, and D41, and the adhesive supply unit 143. The disposing of the lifters 146 is not particularly limited. In FIG. 4, the magnetic steel plate MS conveyed over the die member is indicated by dashed lines, and as an example, the lifters 146 can be provided near both ends of the magnetic steel plate MS conveyed over the die plates D31 and D41. As shown in FIG. 4, the plurality of lifters 146 are arranged along the conveying direction X of the magnetic steel plates MS.

Regarding the lifter 146, when the punching is performed on the magnetic steel plate MS by upward and downward movement of the upper die 150, a height of an upper end of the lifter 146 can be equal to heights of the surfaces of the die plates D11, D21, D31, and D41, and the adhesive supply unit 143. As an example, the lifter 146 can be configured such that a pin extending in the up-down direction is supported by an elastic member provided below the pin so that the lifter 146 can move in the up-down direction. According to such a configuration, while the magnetic steel plate MS is being conveyed, the lifter 146 can extend upward to support the magnetic steel plate MS in a state of being separated from the surfaces of the die plates D11, D21, D31, and D41, and the adhesive supply unit 143. On the other hand, when the punching is performed on the magnetic steel plate MS, by lowering the lifter 146, the magnetic steel plate MS can be pressed against the surfaces of the die plates D11, D21, D31, D41, and the adhesive supply unit 143. The lifter 146 is not limited to the configuration described above.

Returning to FIG. 3, the upper die 150 includes a punch holder 151, a stripper 152, and the plurality of punches P1 to P4. The punch holder 151 is disposed above the die holder 142 in a manner of facing the die holder 142. The punch holder 151 is configured to hold the plurality of punches P1 to P4 on a lower surface side of the punch holder 151.

The punch holder 151 is provided with the plurality of guide bushes 151a. The plurality of guide bushes 151a are positioned to correspond to the plurality of guide posts 144, respectively. Each guide bush 151a is cylindrical, for example, and the guide post 144 can be inserted through an inner space of the guide bush 151a. If the guide post 144 is attached to the upper die 150, the guide bush 151a may be provided to the lower die 140.

A plurality of through holes 151b are provided in the punch holder 151. A step is formed on an inner peripheral surface of the through hole 151b. Therefore, a diameter of an upper portion of the through hole 151b is set larger than a diameter of a lower portion of the through hole 151b.

The stripper 152 is configured to remove, from the punches P1 to P4, the magnetic steel plate MS that sticks to the punches P1 to P4 when the magnetic steel plate MS is punched by the punches P1 to P4. At the same time, the stripper 152 is configured to press the magnetic steel plate MS against the adhesive supply unit 143. The stripper 152 presses the magnetic steel plate MS against the adhesive supply unit 143, so that the adhesive ejected from the ejection port 147 adheres to a predetermined position on a back surface of the magnetic steel plate MS. The stripper 152 is disposed between the die members D1 to D4 and the adhesive supply unit 143 and the punch holder 151.

The stripper 152 is connected to the punch holder 151 via connection members 152a. Each connection member 152a includes an elongated main body and a head provided at an upper end of the main body. The main body of the connection member 152a is inserted into the lower portion of the through hole 151b and can move up and down within the through hole 151b. A lower end of the main body of the connection member 152a is fixed to the stripper 152. A biasing member 152b such as a compression coil spring is attached around the main body of the connection member 152a and is positioned between the punch holder 151 and the stripper 152, for example.

The head of the connection member 152a is disposed above an upper portion of the step of the through hole 151b. An outer shape of the head of the connection member 152a is set larger than an outer shape of the main body of the connection member 152a when viewed from above. Therefore, the head of the connection member 152a can move up and down in the upper portion of the through hole 151b, and the step of the through hole 151b functions as a stopper, so that the head cannot move to the lower portion below the step of the through hole 151b. Therefore, the stripper 152 is suspended and held by the punch holder 151 so as to be movable relative to the punch holder 151 in the up-down direction.

Through holes are formed in the stripper 152 at positions corresponding to the punches P1 to P4. The through holes extend in the up-down direction. The through holes respectively communicate with the corresponding die holes D13 to D43 when viewed from above. Lower portions of the punches P1 to P4 are respectively inserted into the through holes. The lower portions of the punches P1 to P4 are slidable within the respective through holes.

The punches P1 to P4 are arranged in an order from an upstream side toward a downstream side of the pressing device 130. Lower end portions of the punches P1 to P4 have shapes corresponding to the die holes D13 to D43, respectively. A configuration in which a plurality of punches P1 are provided according to the number of die holes or the like may be employed.

The press machine 160 is positioned above the upper die 150. A piston of the press machine 160 is connected to the punch holder 151 and operates based on the instruction signal from the controller Ctr. When the press machine 160 operates, the piston of the press machine 160 expands and contracts, and the upper die 150 moves up and down as a whole.

Laminated Iron Core Manufacturing Method

Next, a manufacturing method for the laminated body 10 will be described with reference to FIGS. 4 and 5. Only an outline of the punching performed by the operations of the punches P1, P2 and the die members D1, D2 will be described.

The magnetic steel plate MS is intermittently fed to the pressing device 130 by the feed device 120 and moves along the conveying direction X. When the predetermined portion of the magnetic steel plate MS reaches the die member D1, the press machine 160 operates to push the upper die 150 downward toward the lower die 140. When the stripper 152 reaches the magnetic steel plate MS, the stripper 152 pushes the magnetic steel plate MS held on the lifters 146 downward. When the lifters 146 are lowered by pushing the stripper 152, the magnetic steel plate MS on the lifters 146 come into contact with the surface of the die member D1. After the magnetic steel plate MS is sandwiched between the stripper 152 and the die member D1, the press machine 160 also pushes the upper die 150 downward.

In this case, the stripper 152 does not move, but the punch holder 151 and the punches P1 to P4 continue to descend. Therefore, tip portions of the punches P1 to P4 respectively move downward through the through holes of the stripper 152 and reach the die holes D13 to D43. In this process, the punch P1 punches the magnetic steel plate MS along the die hole D13. The punched waste material is discharged from the discharge hole C1. Then, the press machine 160 operates to raise the upper die 150.

Next, the magnetic steel plate MS is intermittently fed by the feed device 120, and when the predetermined portion of the magnetic steel plate MS reaches the die member D2, the press machine 160 moves the upper die 150 up and down, and the magnetic steel plate MS is punched by the punch P2 in the same manner as described above. Accordingly, the following through hole is formed in the magnetic steel plate MS. The punched waste material is discharged from the discharge hole C2.

Next, the magnetic steel plate MS is intermittently fed by the feed device 120, and when the predetermined portion (see a processed portion A1 in FIG. 5) of the magnetic steel plate MS reaches the die member D3, the press machine 160 moves the upper die 150 up and down, and the magnetic steel plate MS is punched by the punch P3 in the same manner as described above. Accordingly, the following through hole Wa (see the processed portion A1 in FIG. 5) is formed in the magnetic steel plate MS. The punched waste material is discharged from the discharge hole C2.

Next, the magnetic steel plate MS is intermittently fed by the feed device 120, and when the predetermined portion (see a processed portion A2 in FIG. 5) of the magnetic steel plate MS reaches the adhesive supply unit 143, the press machine 160 operates to push the upper die 150 downward toward the lower die 140. In this case, when the stripper 152 reaches the magnetic steel plate MS, the stripper 152 pushes the magnetic steel plate MS held on the lifters 146 downward. When the lifters 146 are lowered by pushing the stripper 152, the magnetic steel plate MS on the lifters 146 comes into contact with the surface of the adhesive supply unit 143. After the magnetic steel plate MS is sandwiched between the stripper 152 and the adhesive supply unit 143, the press machine 160 also pushes the upper die 150 downward.

By the drive of the liquid feed pump P, the adhesive is supplied from the liquid tank 149 through the pipe L2 and the supply path L1 to the plurality of ejection ports 147 of the adhesive supply unit 143. Therefore, a liquid adhesive is supplied to the surface of the adhesive supply unit 143 at a position corresponding to the ejection port 147. In this state, when the magnetic steel plate MS is sandwiched between the stripper 152 and the adhesive supply unit 143, the adhesive adheres to the predetermined position on the lower surface (a surface on a lower die 140 side) of the magnetic steel plate MS. The processed portion A2 in FIG. 5 shows a state in which an adhesive B is applied to positions corresponding to the ejection ports 147 on the lower surface of the magnetic steel plate MS. As shown in FIG. 4, the ejection ports 147 are disposed such that the adhesive is not applied to regions corresponding to the contact regions S1 to S4 with the lifters 146 (lifters 146a, 146b, 146c, and 146d) of the magnetic steel plate MS. Therefore, the adhesive is applied in a manner that the unapplied regions N of the adhesive (see the processed portion A2 in FIG. 5) are provided on the punched member W. When the ejection ports 147 are disposed as shown in FIG. 4, the adhesive-unapplied regions N are provided at two opposing locations on the periphery of the annular portion Wb of the punched member W.

Next, the magnetic steel plate MS is intermittently fed by the feed device 120, and when the predetermined portion (see a processed portion A3 in FIG. 5) of the magnetic steel plate MS reaches the die member D4, the press machine 160 moves the upper die 150 up and down, and the magnetic steel plate MS is subjected to the punching (outer diameter punching) performed by the punch P4 in the same manner as described above. Accordingly, the punched member W is formed. The punched member W which is punched out is laminated in the die hole D43 and on the previously punched-out punched member W.

The plurality of punched members W punched as described above are rotated and laminated in the die hole D43 such that the tooth pieces We overlap each other in a height direction. Thereafter, when a predetermined number of punched members W are laminated, the laminated body 10 is completed.

When the laminated body 10 is formed while rotating and laminating the punched members W having the adhesive-unapplied regions N as described above, as shown in FIG. 1, the unapplied regions N are distributed along the periphery of the stator laminated iron core 1. In other words, the adhesive-unapplied regions provided for each punched member W include a non-overlapped region in a plan view. The example shown in FIG. 1 shows a state in which every eight punched members W are laminated. A timing of the rotating lamination is not particularly limited, and for example, the punched members W may be rotated and laminated each time one plate is laminated, or may be rotated and laminated each time a plurality of plates are laminated as shown in FIG. 1.

Modification

Figure 6:
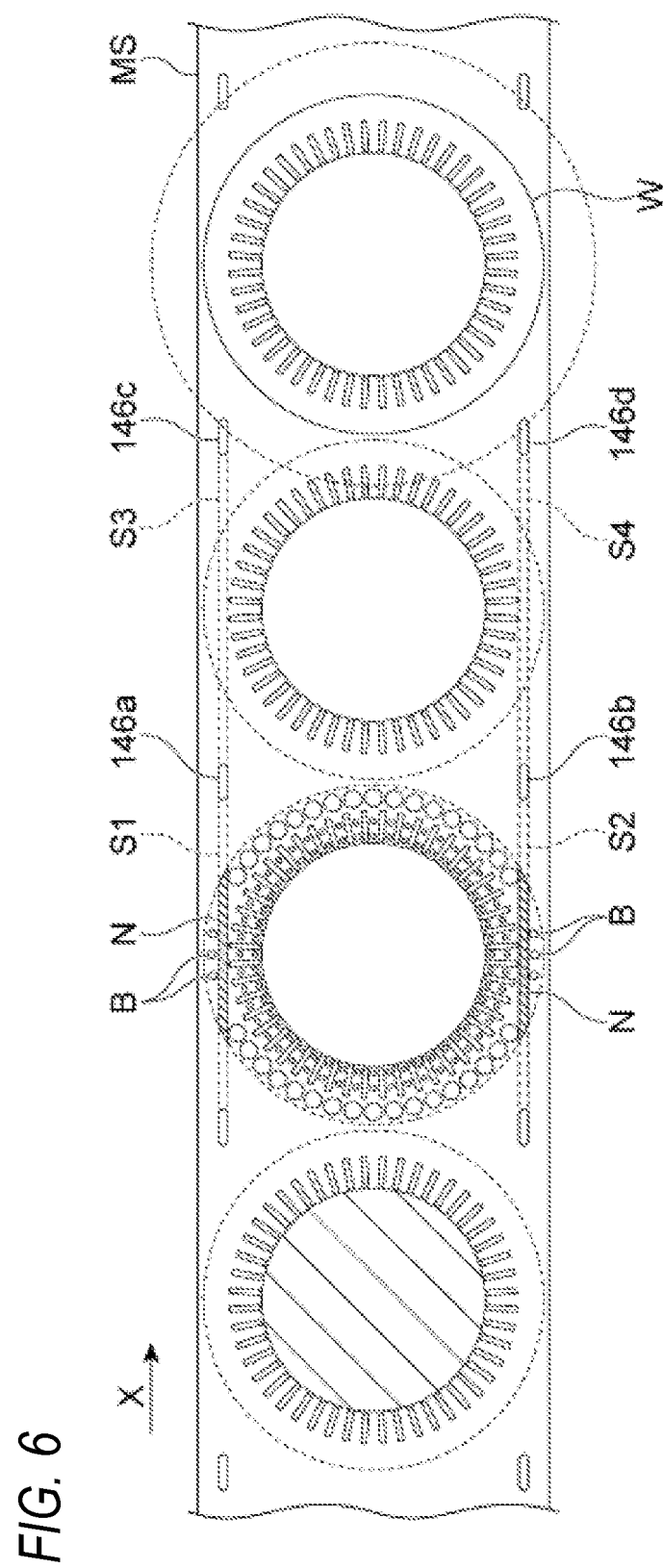
FIG. 6 is a diagram showing a modification of the processing layout of the stator laminated iron core.

Next, modifications of the manufacturing apparatus and manufacturing method for the stator laminated iron core 1 described above will be described. FIG. 6 shows an example in which a shape of the unapplied regions N formed on the magnetic steel plate MS is changed by changing the arrangement of the ejection ports 147.

In the example shown in FIG. 6, the arrangement of the lifters 146 (lifters 146a, 146b, 146c, and 146d) is the same as those in FIGS. 4 and 5. Therefore, shapes of the contact regions S1 to S4 are also the same as those of the magnetic steel plate MS shown in FIG. 5. On the other hand, in the example shown in FIG. 6, the arrangement of the ejection ports 147 in the adhesive supply unit 143 is changed, and the ejection ports 147 are provided outside the regions corresponding to the contact regions S1 to S4 in the magnetic steel plate MS. As a result, the unapplied regions N of the punched member W have substantially the same shape as the regions corresponding to the contact regions S1 to S4. With such a configuration, it is possible to make the adhesive-unapplied regions N smaller as compared with the example shown in FIG. 5.

Next, an example of modifying the shape of the lifter 146 will be described. In the lifter 146 described above, a contact surface of the lifter 146 with respect to the magnetic steel plate MS is a rectangle with rounded ends in a longitudinal direction. However, by changing the shape of lifter 146, the shape of the contact surface of lifter 146 with respect to the magnetic steel plate MS can be changed.

Figure 7A:
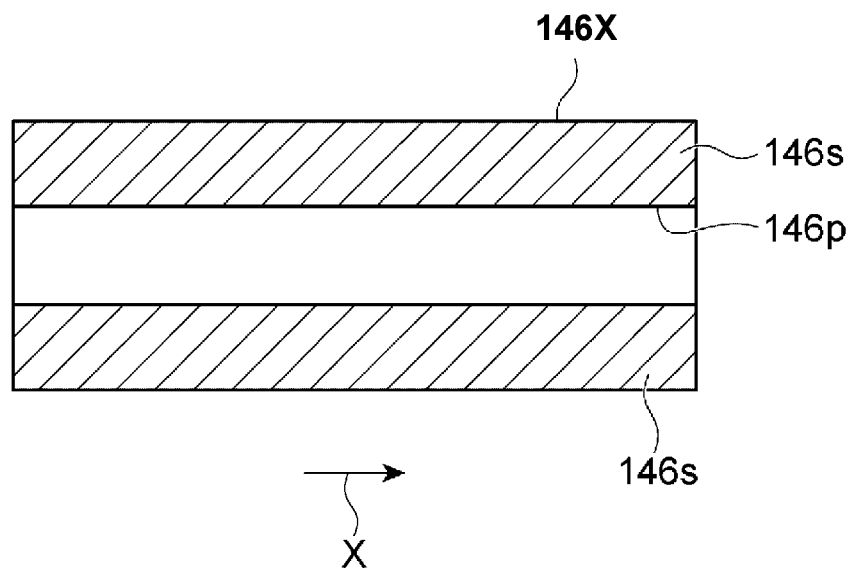
FIG. 7A is a diagram showing a modification of a shape of a lifter.
Figure 7B:
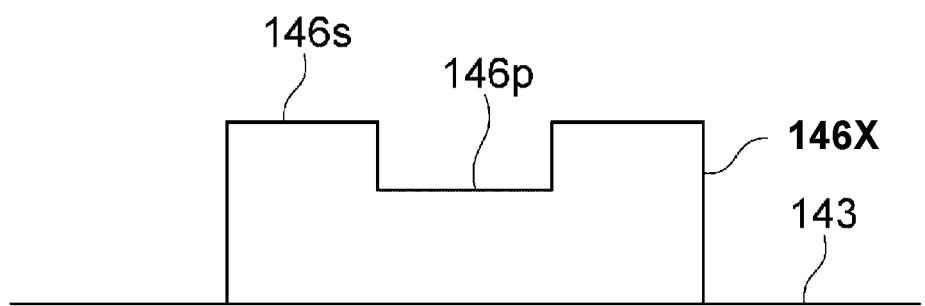
FIG. 7B is a diagram showing the modification of the shape of the lifter.
Figure 7C:
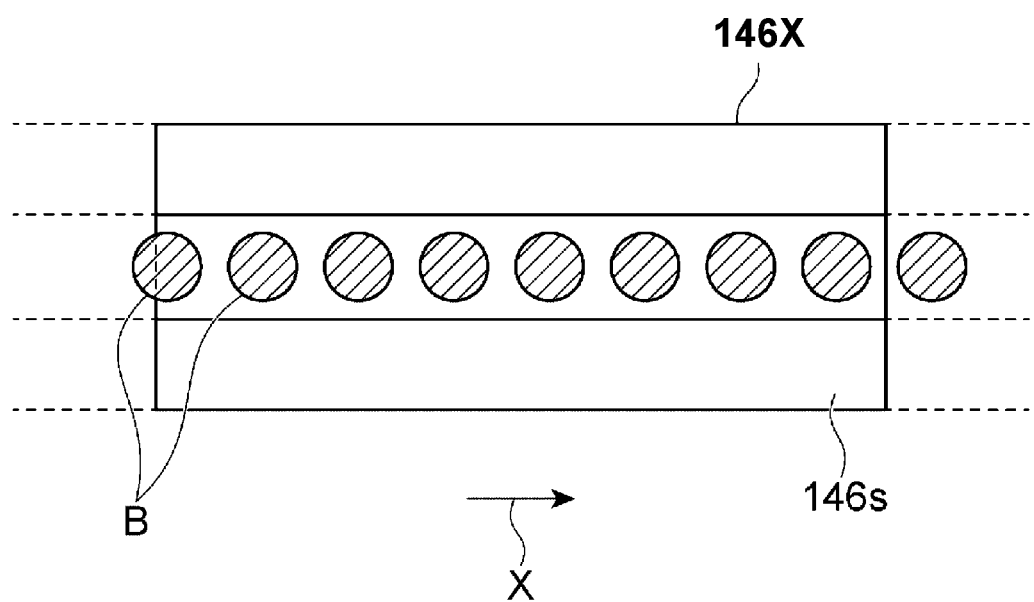
FIG. 7C is a diagram showing a modification of a region to which an adhesive is applied.

FIG. 7A and FIG. 7B are diagrams showing a modification of the shape of the lifter 146. FIG. 7A is a top view of a lifter 146X according to the modification, and FIG. 7B is a view of the lifter 146X according to the modification from the conveying direction X of the magnetic steel plates MS. The lifter 146X has a concave portion 146p extending along the conveying direction X in an upper center. Therefore, an upper surface 146s of the lifter 146X, which can come into contact with the magnetic steel plate MS, is divided into two surfaces by the concave portion 146p, and the two surfaces are separated from each other with the concave portion 146p interposed therebetween. When the lifter 146X on a downstream side of the ejection ports 147 of the adhesive supply unit 143 has such a shape, a contact region of the magnetic steel plate MS with the lifter 146X becomes a region corresponding to the upper surface 146s of the lifter 146X. Therefore, the contact region of the magnetic steel plate MS with the lifter 146X does not include a region that can face the concave portion 146p. Therefore, as shown in FIG. 7C, it is also possible to apply the adhesive B to a region, which faces the concave portion 146p, of the magnetic steel plate MS moving along the conveying direction X.

Accordingly, the shape of the lifter 146 may be changed as appropriate. The region may be changed as appropriate within a range in which the adhesive can be applied while avoiding the contact region where the magnetic steel plate MS can come into contact with the lifter 146 on the downstream side of the adhesive ejection ports 147 of the adhesive supply unit 143 and on an upstream side of the die D42.

From the above point of view, the adhesive-unapplied region may be designed in consideration of the arrangement of the lifters 146 with respect to the magnetic steel plate MS. Therefore, there is no particular limitation as to how the punched member W is formed from the magnetic steel plate MS. For example, in the above-described embodiment, in the pressing device 130, a case has been described in which the die members D1 to D4 for forming the punched member W and the adhesive supply unit 143 are arranged in a row along the conveying direction X of the magnetic steel plate MS. On the other hand, a pressing device may be used in which the die members D1 to D4 necessary for forming the punched member W and the adhesive supply unit 143 are arranged in two rows along the conveying direction X of the magnetic steel plate MS. In such a case, a relationship between the lifters 146 and adhesive-applied regions described in the above embodiment may also be applied.

Figure 8:
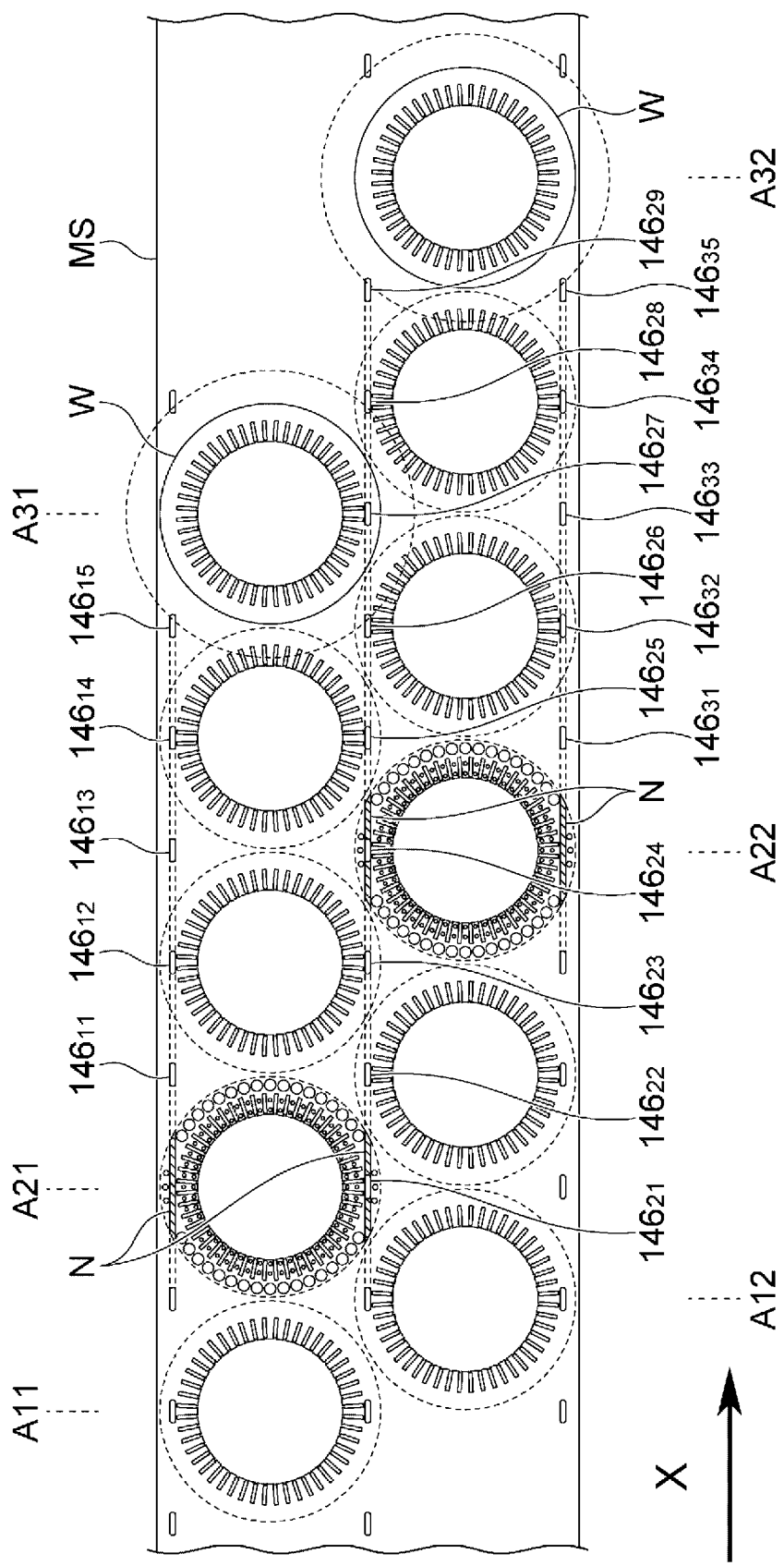
FIG. 8 is a diagram showing a modification of the processing layout of the stator laminated iron core.

FIG. 8 is a diagram showing an example of a processing layout of a stator laminated iron core when a series of processing mechanisms, that is, the die members D1 to D4 necessary for forming the punched member W and the adhesive supply unit 143 are arranged in two rows along the conveying direction X. In the example shown in FIG. 8, it is possible to punch two punched members W along a width direction (direction perpendicular to the conveying direction X) of the magnetic steel plate MS. In the apparatus with two-row arrangement, punching is performed at two processed portions A11 and A12. Similarly, the adhesive is applied at processed portions A21 and A22, and the punching for forming the punched members W is performed at processed portions A31 and A32. Regarding a region of the magnetic steel plate MS punched at the processed portion A11, the adhesive B is applied at the processed portion A21, and the punched member W is formed at the processed portion A31 by a device corresponding to the die member D4 and the punch P4. On the other hand, regarding a region of the magnetic steel plate MS punched at the processed portion A12, the adhesive B is applied at the processed portion A22, and the punched member W is formed at the processed portion A32 by a device corresponding to the die member D4 and the punch P4. In the example shown in FIG. 8, the processed portions A31 and A32 for punching out the punched member W are shifted from each other along the conveying direction X, and this point may be changed as appropriate depending on a structure of each part of the device.

Support by the lifter 146 is also performed in such an apparatus with two-row arrangement. FIG. 8 shows lifters $146_{11}$ to $146_{15}$, lifters $146_{21}$ to $146_{29}$, and lifters $146_{31}$ to $146_{35}$ provided between the processed portion A21 and the processed portion A31 and between the processed portion A22 and the processed portion A32. The lifters $146_{11}$ to $146_{15}$, the lifters $146_{21}$ to $146_{29}$, and the lifters $146_{31}$ to $146_{35}$ are arranged in a line along the conveying direction X, respectively. In such a case, the magnetic steel plate MS is provided with contact regions with the lifters according to the arrangement of the lifters $146_{11}$ to $146_{15}$, the lifters $146_{21}$ to $146_{29}$, and the lifters $146_{31}$ to $146_{35}$. Therefore, the adhesive-applied regions in the processed portions A21 and A22 are designed based on the arrangement of the lifters $146_{11}$ to $146_{15}$, the lifters $146_{21}$ to $146_{29}$, and the lifters $146_{31}$ to $146_{35}$, so that the adhesive-unapplied region N can be formed on the magnetic steel plate MS.

When the number of lifters increases as in the example shown in FIG. 8, it is necessary to increase the unapplied region N to prevent the adhesive from adhering to the lifters. In the example shown in FIG. 8, the lifters $146_{11}$ to $146_{15}$, the lifters $146_{21}$ to $146_{29}$, and the lifters $146_{31}$ to $146_{35}$ are respectively arranged in a row, and thus, an area of the unapplied region N can be reduced. On the other hand, for example, if an area of the upper surface of the lifter 146 is increased to increase the contact region with the magnetic steel plate MS, the unapplied region N needs to be increased. Accordingly, the shape, number, and arrangement of the lifters 146 are not particularly limited, but it is necessary to appropriately change the shape of the unapplied region N according to the arrangement of the lifters 146.

Effects

In the laminated iron core manufacturing apparatus and manufacturing method including the pressing device 130 described in the above embodiment, the magnetic steel plates MS are intermittently fed sequentially in the conveying direction X (see FIGS. 4 and 5). The magnetic steel plate MS is supported by the lifters 146 while being separated from the surfaces of die plates D11, D21, D31, and D41, and adhesive supply unit 143. In this case, the adhesive supply unit 143 applies the liquid material to the magnetic steel plate MS while avoiding, in the regions to be the punched members W, the contact region where the magnetic steel plate MS comes into contact with the lifter 146 on the downstream side of the adhering location of the liquid material in the adhesive supply unit 143 and on the upstream side of the punch P4 and the die D42 functioning as a punching unit. Specifically, the adhesive ejection port 147 is provided avoiding the contact regions S1 to S4, which come into contact with any one of the lifters 146a to 146d, of the magnetic steel plates MS. Accordingly, the unapplied regions N including the contact regions S1 to S4 are provided on (the punched member W formed from) the magnetic steel plate MS.

With the configuration as described above, the adhesive can be prevented from adhering to the upper surfaces of the lifters 146a, 146b, 146c, and 146d, and the adhesive adhering to the lifters can be prevented from further adhering to other regions of the magnetic steel plate MS. It is possible to reduce a maintenance work or the like that occurs when the adhesive adheres to the lifter.

As a magnetic steel plate used for a laminated iron core is becoming thinner, there is a possibility that the tooth pieces Wc and the like may hang down and interfere with the die members and the like in the pressing device 130. Therefore, in the pressing device 130, a configuration in which the lifters 146 support the magnetic steel plate MS is studied. On the other hand, when the laminated iron core is formed by punching the magnetic steel plate MS after applying the adhesive to form the punched members W, the lifter 146 may support the magnetic steel plate MS after the adhesive is applied, and the adhesive may adhere to the lifter 146.

In order to avoid the problem described above, it is also considered to support a region of the magnetic steel plate MS to which the adhesive is not normally applied, that is, the outside of the region to be punched as the punched member W by a lifter. However, increasing a width of the magnetic steel plate MS in order to secure a region for supporting by the lifter leads to an increase in material costs. Therefore, it is required to prevent the adhesive from adhering to the lifter while preventing an increase in material costs.

Regarding this, in the laminated iron core manufacturing apparatus described in the present embodiment, in the regions to be punched members W, the contact regions S1 to S4 that come into contact with the lifters 146 are provided with the adhesive-unapplied regions N. With such a configuration, it is possible to prevent the adhesive from adhering to the lifters 146 (lifters 146a, 146b, 146c, and 146d) that support the magnetic steel plate MS after the adhesive is applied. In particular, it is possible to prevent the adhesive from adhering to the lifter while preventing the width of the magnetic steel plate MS from being increased, thereby preventing an increase in material costs.

In the laminated iron core manufacturing apparatus described above, the rotating lamination is performed to laminate the plurality of punched members W while relatively shifting the angle between the punched members W after punching. With such a configuration, in a laminated iron core formed by laminating the punched members W having the unapplied regions N as described above, it is also possible to prevent rigidity from being lowered only in one direction. In addition, it is possible to prevent unevenness in a thickness depending on the presence or absence of the adhesive.

In a laminated iron core which is manufactured by the rotating lamination as described above and in which three or more punched members W punched out from magnetic steel plates MS are laminated and adhered with an adhesive, each of the adhesive-unapplied regions N is provided between the adjacent punched members W, and the adhesive-unapplied region N provided between the adjacent punched members includes a non-overlapped region in a plan view. With such a configuration, in a laminated iron core formed by laminating the punched members W having the unapplied regions N as described above, it is also possible to prevent rigidity from being lowered only in one direction. In addition, it is possible to prevent unevenness in a thickness depending on the presence or absence of the adhesive.

As the lifter 146X described in the modification above, the lifter 146X may have the concave portion 146p extending along the conveying direction X of the magnetic steel plates MS conveyed by the convey unit, and the adhesive supply unit 143 may apply the adhesive to a region, which faces the concave portion 146p, of the magnetic steel plate MS. With such a configuration, it is possible to prevent the adhesive-unapplied region N from spreading over a wide area, thereby preventing a decrease in an adhesive force due to the provision of the unapplied region N.

The lifter 146 is provided such that the regions of the punched member W that are different from the regions becoming the tooth pieces Wc become the contact regions S1 to S4. With such a configuration, it is possible to prevent the specific tooth piece Wc from being provided with the adhesive-unapplied region N, thereby preventing the tooth piece Wc from being adhered properly and reducing rigidity. During an operation of the motor, a magnetic field strength at tips of the tooth portions 3 of the stator laminated iron core 1 is increased. Therefore, if the tooth pieces Wc are not properly adhered to each other, the tooth pieces Wc of the laminated punched members W may repel each other due to a magnetic force and become easily peeled off. As described above, when the regions different from the region of the tooth piece Wc in the punched member W become the contact regions S1 to S4, it is possible to reduce a possibility of damage to the stator laminated iron core 1 due to the generation of the magnetic force as described above. In the case of the stator laminated iron core 1 as described in the above embodiment, by providing the unapplied region N in the annular portion Wb corresponding to the yoke portion 2, it is possible to prevent the rigidity of the laminated iron core from decreasing.

The lifters on the downstream side of the adhering location of the adhesive in the adhesive supply unit 143 and on the upstream side of the die D42 and the punch P4 are arranged along the conveying direction X of the magnetic steel plate MS. For example, the lifters 146a, 146b, 146c, and 146d shown in FIGS. 4 and 5 are arranged in two rows. With such a configuration, since the unapplied region N for preventing the adhesive from adhering to the lifters 146a, 146b, 146c, and 146d can be made small, it is possible to prevent deterioration in rigidity of the laminated iron core after adhesion.

The present disclosure is not limited to the above-described embodiments as they are, and can be embodied by modifying constituent elements without departing from the scope of the present disclosure at an implementation stage. Various inventions can be formed by appropriately combining a plurality of constituent elements disclosed in the above embodiments.

For example, in the above embodiment, the manufacturing apparatus 100 for manufacturing a stator laminated iron core has been described, but a die apparatus may be an apparatus for manufacturing a rotor laminated iron core. A laminated iron core to be manufactured by the manufacturing apparatus 100 is not particularly limited. Depending on a shape of a laminated iron core, that is, a shape of a punched member W punched out from the magnetic steel plate MS, a location becoming the adhesive-unapplied region N (that is, a location where the lifter 146 is provided) may be changed as appropriate.

The configuration and arrangement of the lifters 146 may be changed as appropriate. The shape, number, and the like of the lifters 146 may also be changed as appropriate. For example, in the above embodiment, the lifters 146 support both ends of the magnetic steel plate MS in the width direction or support the center of magnetic steel plate MS, but the arrangement of lifters 146 may be changed as appropriate. Although the longitudinal direction of the lifters 146 corresponds to the conveying direction X of the magnetic steel plate in the above embodiment, the longitudinal direction of the lifters 146 may be inclined with respect to the conveying direction X.

In the above embodiment, the case where the adhesive is applied to the magnetic steel plate MS has been described, but the configuration in which the magnetic steel plate MS is provided with the unapplied region as described above can also be applied to the case where the magnetic steel plate MS is applied with a liquid material other than the adhesive. Specifically, examples of the liquid material include a primer. The configuration described in the above embodiment is generally applied to a case where a liquid material that may adhere to the lifter 146 and that may cause problems when adhering to the lifter 146 adheres to the magnetic steel plate MS.

Although the configuration in which the adhesive supply unit 143 is provided in the pressing device 130 has been described, the configuration for applying the adhesive to the magnetic steel plate MS (configuration for adhering liquid material) may not be implemented integrally with the pressing device 130, and may be implemented by a separate device.

Note

The specific example described above includes the following configurations.

A laminated iron core manufacturing apparatus according to an aspect of the present disclosure is a laminated iron core manufacturing apparatus for laminating a plurality of punched members obtained by punching a magnetic steel plate, including: a convey unit configured to convey the magnetic steel plate; a lifter configured to support the magnetic steel plate conveyed by the convey unit; a liquid material supply unit configured to adhere a liquid material to regions to be the punched members of one main surface of the magnetic steel plate conveyed by the convey unit; and a punching unit configured to punch the magnetic steel plate after the liquid material is applied to form the punched members, in which the liquid material supply unit adheres the liquid material to the magnetic steel plate while avoiding, in the regions to be the punched members, a contact region where the lifter on a downstream side of an adhesion location of the liquid material in the liquid material supply unit and on an upstream side of the punching unit comes into contact with the magnetic steel plate.

It is possible to adopt an aspect further including a rotating lamination unit configured to rotate and laminate the plurality of punched members while relatively shifting an angle between the punched members formed by the punching unit.

It is possible to adopt an aspect in which the lifter has a concave portion extending along a conveying direction of the magnetic steel plate conveyed by the convey unit, and the liquid material supply unit adheres the liquid material to a region, which faces the concave portion, of the magnetic steel plate.

It is possible to adopt an aspect in which the lifter is provided such that a region different from a region to be a tooth portion in the punched member is the contact region.

It is possible to adopt an aspect in which the lifter on the downstream side of the adhesion location of the liquid material in the liquid material supply unit and on the upstream side of the punching unit is arranged along the conveying direction of the magnetic steel plate conveyed by the convey unit.

A laminated iron core according to an aspect of the present disclosure is a laminated iron core in which three or more punched members obtained by punching a magnetic steel plate are laminated and adhered with an adhesive, in which each of adhesive-unapplied regions is provided between the adjacent punched members, and the adhesive-unapplied region provided between the adjacent punched members includes a non-overlapped region in a plan view.

A laminated iron core manufacturing method according to an aspect of the present disclosure is a laminated iron core manufacturing method for laminating a plurality of punched members obtained by punching a magnetic steel plate, including: supporting the magnetic steel plate conveyed by a convey unit by a lifter; adhering a liquid material to regions to be the punched members of one main surface of the magnetic steel plate by a liquid material supply unit; and punching the magnetic steel plate after the liquid material is applied in a punching unit to form the punched members, in which adhering the liquid material includes adhering the liquid material to the magnetic steel plate while avoiding, in the regions to be the punched members, a contact region where the lifter on a downstream side of the liquid material supply unit and on an upstream side of an adhesion location of the liquid material in the punching unit comes into contact with the magnetic steel plate.

INDUSTRIAL APPLICABILITY

According to the present disclosure, a laminated iron core, a laminated iron core manufacturing method, and a laminated iron core manufacturing apparatus in which a liquid material applied to a plate-shaped member is prevented from adhering to a lifter are provided.

REFERENCE SIGNS LIST 1 stator laminated iron core
1a through hole
2 yoke portion
3 tooth portion
4 slot
110 uncoiler
120 feed device
121, 122 roller
130 pressing device
140 lower die
141 base
142 die holder
143 adhesive supply unit
146 lifter
147 ejection port
149 liquid tank
C1, C2, C3, C4 discharge hole
Ctr controller (control unit)
D1, D2, D3, D4 die member
D11, D21, D31, D41 die plate
D12, D22, D32, D42 die
D13, D23, D33, D43 die hole
D44 rotation member
D45 drive mechanism
L1 supply path
L2 pipe
P liquid feed pump
P1, P2, P3, P4 punch

The invention claimed is:

1. A laminated iron core manufacturing apparatus for laminating a plurality of punched members obtained by punching a plate-shaped member, comprising:
    a convey unit configured to convey the plate-shaped member;
    a lifter configured to support the plate-shaped member conveyed by the convey unit;
    a liquid material supply unit configured to adhere a liquid material to regions to be the punched members of one main surface of the plate-shaped member conveyed by the convey unit; and
    a punching unit configured to punch the plate-shaped member after the liquid material is applied to form the punched members,
    wherein the liquid material supply unit adheres the liquid material to the plate-shaped member while avoiding, in the regions to be the punched members in the plate-shaped member, a contact region where the lifter on a downstream side of an adhesion location of the liquid material in the liquid material supply unit and on an upstream side of the punching unit comes into contact with the plate-shaped member.

2. The laminated iron core manufacturing apparatus according to claim 1, further comprising:
    a rotating lamination unit configured to rotate and laminate the plurality of punched members while relatively shifting an angle between the punched members formed by the punching unit.

3. The laminated iron core manufacturing apparatus according to claim 1,
    wherein the lifter has a concave portion extending along a conveying direction of the plate-shaped member conveyed by the convey unit, and
    wherein the liquid material supply unit adheres the liquid material to a region, which faces the concave portion, of the plate-shaped member.

4. The laminated iron core manufacturing apparatus according to claim 1, wherein the lifter is provided such that a region different from a region to be a tooth portion in the punched member is the contact region.

5. The laminated iron core manufacturing apparatus according to claim 1, wherein the lifter on the downstream side of the adhesion location of the liquid material in the liquid material supply unit and on the upstream side of the punching unit is arranged along the conveying direction of the plate-shaped member conveyed by the convey unit.

6. A laminated iron core in which three or more punched members obtained by punching a plate-shaped member are laminated and adhered with an adhesive,
- wherein each punched member comprises an adhesive-unapplied region, and
- wherein each adhesive-unapplied region comprises a non-overlapped region that does not overlap with another adhesive-unapplied region in a plan view.

7. A laminated iron core manufacturing method for laminating a plurality of punched members obtained by punching a plate-shaped member, comprising:
- adhering a liquid material to regions to be the punched members of one main surface of the plate-shaped member;
- supporting the conveyed plate-shaped member by a lifter; and
- punching the plate-shaped member after adhering the liquid material to form the punched members,
- wherein adhering the liquid material includes adhering the liquid material to the plate-shaped member while avoiding, in the regions to be the punched members, a contact region where the lifter on a downstream side of an adhesion location of the liquid material and on an upstream side of a forming location of the punched members comes into contact with the plate-shaped member.

8. The laminated iron core manufacturing apparatus according to claim 1,
- wherein the lifter is configured to support the plate-shaped member by contacting the contact region, and
- wherein the contact region is:
  - a part of a region that becomes a yoke portion of the punched member;
  - provided outward in a width direction of the plate-shaped member compared to a region that becomes a teeth portion of the punched member; and
  - extends along a conveying direction of the plate-shaped member.

9. The laminated iron core manufacturing method according to claim 7,
- wherein the supporting comprises supporting the plate-shaped member by contacting the contact region, and
- wherein the contact region is:
  - a part of a region that becomes a yoke portion of the punched member;
  - provided outward in a width direction of the plate-shaped member compared to a region that becomes a teeth portion of the punched member; and
  - extends along a conveying direction of the plate-shaped member.

* * * * *